United States Patent
Clark

(10) Patent No.: US 6,812,309 B2
(45) Date of Patent: Nov. 2, 2004

(54) DIGITALLY ENCODED POLYMERS

(75) Inventor: Patrick Albert Clark, Valley Forge, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/320,232

(22) Filed: Dec. 16, 2002

(65) Prior Publication Data

US 2003/0130463 A1 Jul. 10, 2003

Related U.S. Application Data

(60) Provisional application No. 60/345,803, filed on Jan. 8, 2002.

(51) Int. Cl.$^7$ ............................................. C08F 220/22
(52) U.S. Cl. ..................... 526/245; 526/242; 526/264; 526/280; 526/292.1; 526/292.6; 526/293; 526/319; 526/347; 526/284
(58) Field of Search .................. 526/242, 245, 526/292.1, 292.6, 293, 319, 347.1, 284, 280, 258, 264, 259, 260; 525/351, 329.4, 329.8, 379, 380

(56) References Cited

U.S. PATENT DOCUMENTS

| | | | |
|---|---|---|---|
| 4,431,766 A | 2/1984 | Christie et al. | 524/443 |
| 5,128,419 A | 7/1992 | Fong et al. | 525/351 |
| 5,171,450 A | 12/1992 | Hoots | 210/701 |
| 5,234,475 A | 8/1993 | Malhotra et al. | 44/282 |
| 5,474,937 A | 12/1995 | Anderson, II et al. | 436/27 |
| 5,958,788 A | 9/1999 | Johnson et al. | 436/172 |
| 6,077,461 A * | 6/2000 | Murray et al. | 252/700 |
| 6,344,531 B1 * | 2/2002 | Murray et al. | 526/268 |
| 6,380,431 B1 * | 4/2002 | Whipple et al. | 564/281 |
| 6,645,428 B1 * | 11/2003 | Morris et al. | 422/15 |
| 6,662,635 B2 * | 12/2003 | Mansky | 73/61.41 |
| 2003/0073586 A1 * | 4/2003 | Crossman et al. | 507/227 |

* cited by examiner

Primary Examiner—Tatyana Zalukaeva
(74) Attorney, Agent, or Firm—Kenneth Crimaldi

(57) ABSTRACT

A method for encoding a polymer. The method comprises incorporating, into a polymer formed by polymerizing at least one bulk monomer, from 0.1 ppm to 1% each of at least two additional monomer residues.

7 Claims, No Drawings

DIGITALLY ENCODED POLYMERS

CROSS REFERENCE TO RELATED PATENT APPLICATIONS

This is a non-provisional application of prior pending U.S. provisional application Ser. No. 60/345,803 filed Jan. 8, 2000.

BACKGROUND

This invention relates generally to a method for encoding polymers by incorporation of low levels of monomer residues distinct from the bulk monomer residues.

U.S. Pat. No. 4,431,766 discloses a method for coding a polymeric material by adding a trace amount of a compound detectable by instrumental methods. However, this reference suggests only addition of materials to a pre-formed polymeric material; a potential disadvantage of this method is that the added material could be removed from the polymeric material. Moreover, many of the heavy metals suggested by the '766 patent would be objectionable on the basis of toxicity. There is no suggestion in the '766 patent that the added material should be incorporated into the polymeric material itself.

The problem addressed by this invention is to find a method for encoding information into a polymer for later retrieval for purposes of identification.

STATEMENT OF INVENTION

The present invention is directed to a method for encoding a polymer. The method comprises incorporating, into a polymer formed by polymerizing at least one bulk monomer, from 0.1 ppm to 1% each of at least two additional monomer residues.

DETAILED DESCRIPTION

All percentages and ppm values are on the basis of total polymer weight, unless otherwise indicated. The term "acrylic polymers" refers to polymers of acrylic acid (AA), methacrylic acid (MAA) and their esters, and copolymers predominantly comprising the aforementioned monomers. Esters of AA and MAA include, but are not limited to, methyl methacrylate (MMA), ethyl methacrylate (EMA), butyl methacrylate (BMA), hydroxyethyl methacrylate (HEMA), methyl acrylate (MA), ethyl acrylate (EA), butyl acrylate (BA), and hydroxyethyl acrylate (HEA), as well as other alkyl esters of AA or MAA.

In the method of this invention, a polymer is encoded by incorporating at least two additional monomer residues that can be identified to determine the identity of the polymer. The additional monomer residues must be different from the bulk monomer residues that form the polymer, and preferably, they are present at sufficiently low levels to have no effect or only an insubstantial effect on the physical or chemical properties of the polymer. When it is desired to minimize the effect of the additional monomer residues on polymer properties, it is preferred that the additional monomer residues are of the same chemical class as the bulk monomers, e.g., acrylates or methacrylates in an acrylic polymer, or styrenes in a styrene polymer or co-polymer. A "bulk monomer" is any monomer present in an amount greater than 1%. In one embodiment of the invention, at least two additional monomers are added to the bulk monomer(s) prior to polymerization, and thus become the additional monomer residues in the polymer. In another embodiment of the invention, the additional monomer residues are created by reacting a previously formed polymer with a derivatizing agent which reacts with and becomes incorporated into existing monomer residues at low levels. For example, monomer residues containing carboxylic acid groups can be derivatized by reaction with amines or alcohols to form new monomer residues not present previously in the polymer, or conversely, monomer residues containing hydroxyl or amino groups can be derivatized by reaction with carboxylic acids. In either of these embodiments, the overall content of additional monomer residues in the polymer is achieved either by direct incorporation of additional monomer residues at the desired level into the bulk polymer, or by preparing a "concentrate" polymer having higher levels of the additional monomer residues and then adding the concentrate polymer to uncoded bulk polymer so as to achieve the same overall concentration of additional monomer residues.

A polymer is encoded by the method of this invention by having multiple additional monomer residues present in known ratios with respect to each other, with the identity of the monomer residues, their amounts and their ratios serving as the "code." Identification and quantification of these additional monomer residues would reveal the code and identify the polymer. The code may be used to describe any useful information about the polymer or a formulation into which the polymer is incorporated including, but not limited to, a batch number, manufacturer, manufacture date, customer number, geographical territory, etc. For example, the presence of 3 additional monomer residues, chosen from a pool of 12 monomers, at 3 potential concentrations allows 5940 unique codes to be generated. Preferably, the encoded polymer contains at least three additional monomer residues, more preferably at least four, and most preferably at least five. If a polymer is encoded with 5 additional monomer residues which can be present at 4 potential concentrations and one has a pool of 24 monomers to select from there are 46,378,400 possible codes that can be generated.

In one embodiment of the invention, the encoded polymer is incorporated into a formulated product in which the polymer is a minor constituent. For liquid products, it is preferred to concentrate or separate the polymer from the formulated matrix by any of the well-known methods prior to analysis of the polymer coding.

In one embodiment of the invention, the polymer is identified by degradation. Preferably, the polymer is degraded, either into its constituent monomers, or by chemically degrading an ester, amide, or other functionality in the polymer to release a pendent group. Preferably, the constituents released in the degradation process are detected by mass spectrometry or mass spectrometry coupled to a separation technique such as gas chromatography. If degradation of the polymer is followed by gas chromatography for the separation of the constituent monomers, or their degradation products, techniques other than mass spectrometry may be utilized for detection, e.g., atomic emission or electron capture detection. In another embodiment of the invention, the polymer is identified by separation of intact encoded polymer chains from non-encoded polymer chains using liquid chromatography, with detection by mass spectrometry, atomic emission detection, or other known means of detection. In either of these embodiments, it is preferred not to use absorbance or fluorescence measurements to identify and quantify the monomer residues.

Preferably, each of the additional monomer residues differs in molecular weight by at least 20% from any bulk monomer residue or contains at least one chemical element not present in any bulk monomer residue. This facilitates identification of the additional monomer residues, especially at low levels. More preferably, each of the additional monomer residues differs in molecular weight by at least 50% from any bulk monomer residue. More preferably, each of the additional monomer residues is present in an amount from 0.001% to 0.5%. Most preferably, each of the additional monomer residues is present in an amount from 0.001% to 0.05%.

The present invention is further directed to a polymer having from 0.001% to 0.5% each of at least two monomer residues, each of which differs in molecular weight by at least 20% from any bulk monomer residue or contains at least one chemical element not present in any bulk monomer residue. Preferably, the polymer has from 0.001% to 0.5% each of at least three monomer residues differing in molecular weight by at least 20% from any bulk monomer residue or containing at least one chemical element not present in any bulk monomer residue. More preferably, the polymer has from 0.001% to 0.05% each of at least three monomer residues differing in molecular weight by at least 20% from any bulk monomer residue or containing at least one chemical element not present in any bulk monomer residue. Most preferably, the polymer has from 0.001% to 0.05% each of at least three monomer residues differing in molecular weight by at least 50% from any bulk monomer residue or containing at least one chemical element not present in any bulk monomer residue.

Preferably, the polymer is an acrylic polymer. Useful monomers for encoding addition polymers include, but are not limited to, 2,2,3,3,4,4,5,5-octafluoropentyl acrylate (OFPA), 2,2,3,3,4,4,5,5-octafluoropentyl methacrylate (OFPMA), 2,2,3,3-tetrafluoropropyl methacrylate, 2,2,3,3-tetrafluoropropyl acrylate, 3-fluorostyrene (3-FSTY), 4-fluorostyrene (4-FSTY), 9-anthracenemethyl methacrylate (ANTMA), 3-(trifluoromethyl)styrene, isobornyl acrylate (IBOA), isobornyl methacrylate (IBOMA), 2,6-dichlorostyrene, pentachlorophenyl acrylate, 4-tert-butylcyclohexyl acrylate, 2-ethylhexyl acrylate, 2-ethylhexyl methacrylate, pentabromobenzyl acrylate, 8-bromostyrene, and 2-methyl-2-admantyl acrylate. Useful monomers for encoding condensation polymers include, but are not limited to, 2,3-dibromo-1,4-butanediol, 3-chloro-1,2-propanediol, 3,3-difluoro-1,2-heptanediol, 2-butyl-2-ethyl-1,3-propanediol, 1,2-diphenyl-1,2-ethanediol, 4-fluoro-1,3-phenylene diamine, perfluoroadipic acid, tetrafluoroterephthalic acid, 2,2,3,3,4,4-hexafluoro-1,5-pentanediol, and 4,4'-hexafluoroisopropylidenediphenol.

EXAMPLE

Preparation of Digitally Encoded Latex Polymer

This example demonstrates preparation of a BA/MMA/MAA terpolymer encoded with low levels of three specialty monomers.

A digitally encoded latex polymer was prepared in the following manner: 126 g of deionized (D.I.) water was charged to a kettle (1000 mL five-necked round bottom flask) and was heated to 90° C. The kettle was then charged with a mixture of 0.22 g of sodium carbonate dissolved in 4.0 g of D.I. water, 2.1 g of ammonium persulfate dissolved in 4.0 g of D.I. water and 5.94 g of a 45% solids acrylic latex polymer with a 100 nm particle size plus 3.14 g of D.I. water rinse. After a five minute hold, a monomer emulsion mixture of 124.2 g D.I. water, 4.0 g of Siponate DS-4 (sodium dodecylbenzenesulfonate), 196.4 g of butyl acrylate, 196.3 g of methyl methacrylate, 8.0 g of methacrylic acid, 0.0439 g of 2,2,3,3,4,4,5,5-octafluoropentyl methacrylate, 0.0168 g of isobornyl methacrylate and 0.0178 g of 4-fluorostyrene was slowly added to the kettle over one and one half hours along with co-feeds containing 0.81 g of ammonium persulfate dissolved in 28.8 g of D.I. water and 0.5 g of sodium carbonate dissolved in 28.8 g of D.I. water, also added slowly over the same one and one half hour period. During the addition of the feeds the kettle temperature was maintained at 85° C. Thirty minutes after completion of the feeds the kettle was cooled to 60° C. and 2.0 g of a 0.15% solution of iron (II) sulfate was added. Two chase solutions, consisting of 0.81 g of t-butyl hydroperoxide dissolved in 5.22 g of D.I. water and 0.44 g of sodium formaldehyde sulfoxylate dissolved in 7.9 g of D.I. water, were added in three equal portions over a 30 minute period. Following the addition of the last portions of the chase solutions, the kettle temperature was dropped to 40° C. and the pH of the latex was adjusted to be between 7 and 8 by the addition of ammonium hydroxide.

The polymer synthesized by this procedure can be further formulated into a variety of products including paints. To analyze a dried paint sample formulated with encoded polymer one can grind a small amount of the paint film into a powder, <100 mg. The powder is then placed into a quartz sample holder of a pyrolysis unit, CDS Instruments AS2500. The sample is then thermally decomposed in the pyrolysis unit and the degradation products, including monomers, are swept into the inlet of a gas chromatograph which is equipped with a capillary column and a mass spectrometer as a detector. A Hewlett-Packard 6890 Gas Chromatograph equipped with an HP 5972 MSD (Mass Selective Detector) would be an example of a suitable instrument. Selection of an appropriate capillary column for the analysis of the code depends on the nature of the bulk monomers and the monomers used to encode the polymer. A column such as a J&W Scientific DB-Wax column would provide the necessary resolution for the polymer of this example. Running the mass spectrometer detector in SIMS (Selective Ion Mode) mode allows one to identify the monomers used to encode the polymer.

What is claimed is:

1. A method for encoding a polymer; said method comprising incorporating, into a polymer formed by polymerizing at least one bulk monomer, from 0.1 ppm to 1% each of at least three additional monomer residues; wherein said at least three additional monomer residues are incorporated by polymerization of at least three additional monomers added to said at least one bulk monomer prior to polymerization; and wherein each of said at least three additional monomer residues differs in molecular weight by at least 20% from any bulk monomer residue or contains at least one chemical element not present in any bulk monomer residue, further comprising degrading the polymer into its constituent monomers and detecting said at least three additional monomer residues.

2. The method of claim 1 in which said at least three additional monomer residues are detected by mass spectrometry.

3. The method of claim 2 in which each of said at least three additional monomers is present in an amount from 0.001% to 0.05%.

4. A polymer having from 0.001% to 0.5% of at least two monomer residues formed by polymerization, with at least one bulk monomer, of at least two monomers selected from the group consisting of 2,2,3,3,4,4,5,5-octafluoropentyl acrylate, 2,2,3,3,4,4,5,5-octafluoropentyl methacrylate, 2,2,3,3-tetrafluoropropyl methacrylate, 2,2,3,3tetrafluoropropyl acrylate, 3-fluorostyrene, 4-fluorostyrene, 9-anthracenemethyl methacrylate, 3-(trifluoromethyl) etyrene, isobornyl acrylate, isobornyl methacrylate, 2,6-dichlorostyrene, pentachlorophenyl acrylate, 4-tert-butylcyclohexyl acrylate, 2-ethylhexyl acrylate, 2-ethyihexyl methacrylate, peutabromobenzyl acrylate, 8-bromostyrene, and 2-methyl-2-admantyl acrylate.

5. The polymer of claim 4 having from 0.001% to 0.5% each of at least three monomer residues differing in molecular weight by at least 20% from any bulk monomer residue or containing at least one chemical element not present in any bulk monomer residue.

6. The polymer of claim 5 having from 0.001% to 0.05% each of at least three monomer residues differing in molecular weight by at least 50% from any bulk monomer residue or containing at least one chemical element not present in any bulk monomer residue.

7. The polymer of claim 6 which is an acrylic polymer.

* * * * *